(12) United States Patent
Barber

(10) Patent No.: US 7,027,967 B1
(45) Date of Patent: Apr. 11, 2006

(54) METHOD AND SYSTEM FOR INDICATING ANISOTROPIC RESISTIVITY IN AN EARTH FORMATION

(75) Inventor: Thomas D. Barber, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 977 days.

(21) Appl. No.: 09/585,761

(22) Filed: Jun. 2, 2000

(51) Int. Cl.
 *G06G 7/48* (2006.01)
(52) U.S. Cl. .................. 703/10; 324/368; 324/366
(58) Field of Classification Search .......... 703/10; 324/368, 366
 See application file for complete search history.

(56) References Cited

U.S. PATENT DOCUMENTS

| | | | |
|---|---|---|---|
| 3,697,864 A | | 10/1972 | Runge |
| 4,556,884 A | * | 12/1985 | Howells et al. .......... 340/855.3 |
| 4,916,616 A | * | 4/1990 | Freedman et al. ............ 702/13 |
| 4,968,940 A | | 11/1990 | Clark et al. |
| 5,157,605 A | | 10/1992 | Chandler et al. |
| 5,339,037 A | | 8/1994 | Bonner et al. |
| 5,583,825 A | * | 12/1996 | Carrazzone et al. .......... 367/31 |
| 5,754,050 A | | 5/1998 | Smits et al. |
| 5,852,363 A | | 12/1998 | Smits |
| 5,867,806 A | * | 2/1999 | Strickland et al. .............. 702/7 |
| 5,966,672 A | * | 10/1999 | Knupp ........................ 702/16 |
| 6,023,168 A | | 2/2000 | Minerbo |
| 6,304,086 B1 | * | 10/2001 | Minerbo et al. ............ 324/338 |

FOREIGN PATENT DOCUMENTS

| | | |
|---|---|---|
| EP | 0 478 409 A1 | 4/1992 |
| EP | 0527089 A2 | 2/1993 |
| EP | 0 544 583 A1 | 6/1993 |
| GB | 2102957 A | 6/1982 |
| WO | WO95/03557 A1 | 7/1994 |

OTHER PUBLICATIONS

L.L. Raymer, K.A. Burgess, "The Role of Well Logs in Reservoir Modeling", SPE 9342, 1980, pp. 1-14.*
IEEE 100, The Authoritative Dictionary of IEEE Standards Terms, Seventh Edition, ISBN 1-7381-2601-2, Dec. 2000, p. 39.*

* cited by examiner

*Primary Examiner*—Leo Picard
*Assistant Examiner*—Dwin M. Craig
(74) *Attorney, Agent, or Firm*—Victor H. Segura; Brigitte L. Echols

(57) ABSTRACT

A system and methods for indicating formation resistivity anisotropy and evaluating the vertical resistivity component by combining array induction measurements and array laterolog measurements. Formation measurements are obtained with an induction tool and a laterolog tool. Formation parameter data are derived from the induction tool measurements. The laterolog tool response is modeled using the derived formation parameter data. The formation resistivity anisotropy and/or the vertical resistivity component are determined from a comparison of the modeled laterolog tool response against the apparent measurements obtained with the laterolog tool.

23 Claims, 15 Drawing Sheets

METHOD AND SYSTEM FOR INDICATING ANISOTROPIC RESISTIVITY IN AN EARTH FORMATION

1. BACKGROUND OF THE INVENTION

1.1 Field of the Invention

The present invention is generally directed to the analysis of underground earth formations, and, more particularly, to the determination of formation resistivity properties and/or profiles.

1.2 Description of Related Art

Knowledge of the resistivity properties of underground earth formations is fundamental in the evaluation and characterization of potential and existing hydrocarbon-bearing reservoirs. The terms "logging" and "log" are respectively used herein to designate any sequential measurements and the recording of such measurements as a function of depth and/or time of variations in a given characteristic of the formations around a borehole.

Formation resistivity anisotropy is a characteristic of reservoirs that can complicate formation evaluation. Many reservoir rocks exhibit resistivity anisotropy, especially when saturated with oil. There are several mechanisms, which can produce this anisotropy, among which are very thin sand-shale laminations, depositional changes in clean sandstone, and wind-distributed sands (aeolian formations). See Rubin, D. M., *Cross bedding, bedforms, and paleocurrents*, SOCIETY OF ECONOMIC PALEONTOLOGISTS AND MINERALOGISTS, CONCEPTS IN SEDIMENTOLOGY AND PALEONTOLOGY, 1; Klein et al., *The petrophysics of electrically anisotropic reservoirs*, Transactions of the SPWLA THIRTY-SIXTH ANNUAL LOGGING SYMPOSIUM, Paris, France, Jun. 26–29, 1995, paper HH. Resistivity measurements from within a borehole drilled through these formations have been made by a number of techniques employing the use of well-known instruments, including induction and laterolog (electrode) type devices.

In induction logging, a transmitter coil mounted on a well tool is lowered into a borehole and energized by an alternating current. Indications are then obtained of the influence of surrounding formations on the electromagnetic field established by the coil. Usually such indications are obtained by observing the voltage induced in a receiver coil also mounted on the well tool in coaxial relationship with the transmitter coil and axially spaced apart therefrom. Conventional induction well tools include at least one transmitter and a receiver coil array. Such an induction tool is illustrated and described in U.S. Pat. No. 5,157,605, assigned to the present assignee.

The laterolog technique comprises making a measurement with a well tool having a current emitting electrode and voltage electrodes one either side thereof which are operated to force current into the formation. The current is focused into the formations and returns locally, i.e., to the tool body. The formation resistivity is determined by measuring the current flow. Conventional laterolog tools are illustrated and described in U.S. Pats. Nos. 5,754,050, 5,852,363, 6,023,168, and Documents EP-478409, EP-544583, all assigned to the present assignee. Document EP-544583 describes a laterolog tool including both a "deep" investigation mode and a "shallow" (LLS) investigation mode.

The sensitivity of a resistivity logging tool to resistivity anisotropy depends on the physics of the measurement and the relative dip angle of the well bore of the formation. For example, 2 MHz induction-type tools have no sensitivity to resistivity anisotropy when the formation layers are perpendicular to the well bore, but will be quite sensitive at relative dip angles above 60 degrees. See Lüling et al., *Processing and modeling 2 MHz resistivity tools in dipping, laminated, anisotropic formations*, Transactions of the SPWLA THIRTY-FIFTH ANNUAL LOGGING SYMPOSIUM, Tulsa, Okla., Jun. 19–22, 1994, paper QQ.

Induction logging tools are insensitive to resistivity anisotropy at low relative dip. The current density set up in the formation is limited to the horizontal direction. See Moran et al., *Effects of formation anisotropy on resistivity-logging measurements*, GEOPHYSICS, V. 44, No. 7, July 1979, 1266–86; Anderson et al., *The Response of Induction Tools to Dipping Anisotropic Formations*, Transactions of the SPWLA THIRTY-SIXTH ANNUAL LOGGING SYMPOSIUM, Paris, France, Jun. 26–29, 1995, paper D. At higher relative dips the measured resistivity will combine both vertical and horizontal components, However, the effect does not depend on the coil array spacing, so the components are not resolvable. See Anderson et al., *The Response of Induction Tools to Dipping Anisotropic Formations*, Transactions of the SPWLA THIRTY-SIXTH ANNUAL LOGGING SYMPOSIUM, Paris, France, June 26–29.

Laterolog logging tools have some sensitivity to the vertical component of resistivity. See Moran et al., *Effects of formation anisotropy on resistivity-logging measurements*, GEOPHYSICS, V. 44, No. 7, July 1979, 1266–86; Chemali et al., *The effect of shale anisotropy on focused resistivity devices*, Transactions of the SPWLA TWENTY-EIGHTH ANNUAL LOGGING SYMPOSIUM, London, England, June 30–Jul. 2, 1987, paper H. However, with the dual-laterolog, the deep laterolog was not very sensitive to anisotropy. The shallow laterolog, which returns current to nearby electrodes, is more sensitive to anisotropy (See Moran et al., 1979), but invasion will reduce the effect of anisotropy.

It is desirable to obtain a reliable method and system for determining the resistivity properties and profiles of potential hydrocarbon-bearing zones in subsurface formations. Thus, there remains a need for improved methods and techniques to indicate formation resistivity anisotropy and evaluate the vertical component of resistivity.

2. SUMMARY OF THE INVENTION

Methods and systems are disclosed for combining induction tool and laterolog tool measurements to indicate that the formation resistivity is anisotropic and estimate the vertical component of resistivity even in the presence of invasion.

One aspect of the invention provides a method for determining a characteristic of a subsurface earth formation surrounding a borehole. The method comprises calculating at least one parameter representative of a property of the formation using log data obtained with a first well tool disposed within the borehole; modeling log data from the at least one calculated parameter; and comparing log data obtained with a second well tool disposed within the borehole against the modeled log data to determine the formation characteristic.

Another aspect of the formation provides a method for determining a characteristic of a subsurface earth formation surrounding a borehole. The method comprises disposing first and second well tools within the borehole to obtain measurement data; producing at least one parameter representative of a property of the formation from the measurement data obtained with the first well tool; producing theoretical data from the at least one produced parameter; and comparing the theoretical data against the measurement data obtained with the second well tool to determine the formation characteristic.

Another aspect of the invention provides a well logging system including first and second well tools adapted to be moveable through a borehole and an apparatus adapted to be coupled to the well tools, the apparatus being adapted to respond to data obtained with the well tools to determine a characteristic of a formation. The apparatus comprises means for calculating at least one parameter representative of a property of the formation using log data obtained with the first well tool disposed within the borehole; means for modeling log data from the at least one calculated parameter; and means for comparing log data obtained with the second well tool disposed within the borehole against the modeled log data to determine the formation characteristic.

Yet another aspect of the invention provides a program storage device readable by a processor and encoding a program of instructions including instructions for performing operations in accord with the invention.

3. BRIEF DESCRIPTION OF THE DRAWINGS

Other aspects and advantages of the invention will become apparent upon reading the following detailed description and upon reference to the drawings in which.

4. DETAILED DESCRIPTION OF SPECIFIC EMBODIMENTS

In the interest of clarity, not all features of actual implementation are described in this specification. It will be appreciated that although the development of any such actual implementation might be complex and time-consuming, it would nevertheless be a routine undertaking for those of ordinary skill in the art having the benefit of this disclosure.

Figure 1:
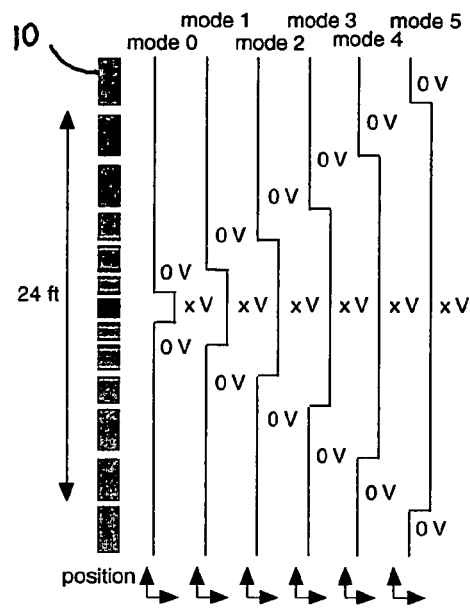
FIG. 1 is a schematic diagram of the laterolog energization patterns obtained with a conventional laterolog tool.
Figure 2:
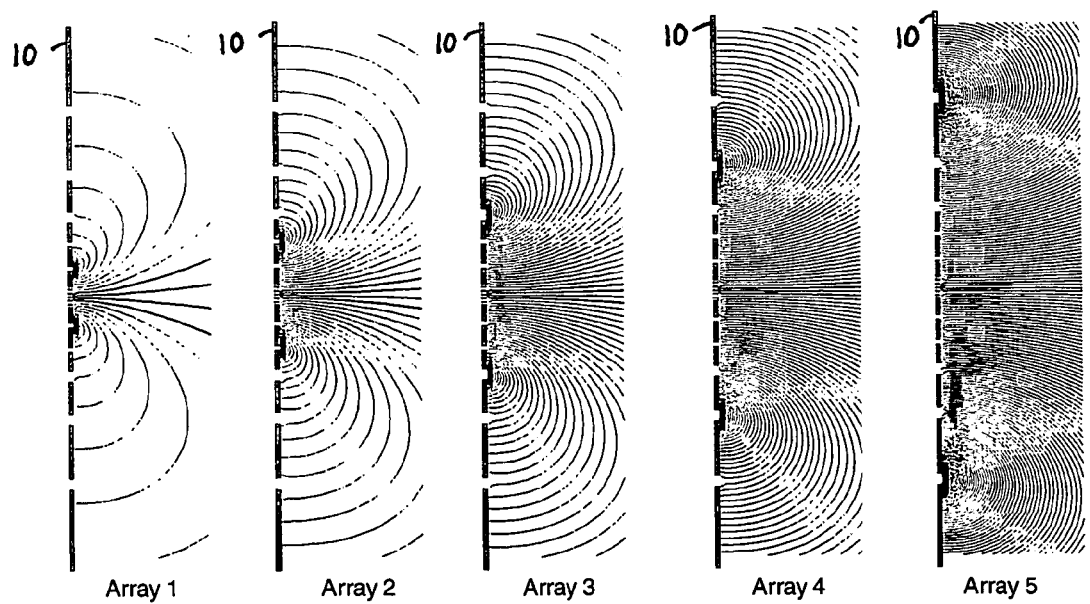
FIG. 2 is a schematic diagram of the current lines corresponding to the laterolog patterns of FIG. 1.

FIG. 1 shows the energization patterns, referred to as "laterologs", obtainable from a laterolog-type tool 10 such as those disclosed in U.S. Pats. Nos. 5,754,050, 5,852,363, 6,023,168, and Document EP-478409. The deepest array, mode 5, is considerably deeper than the LLS and should have considerable sensitivity to anisotropy. FIG. 2 shows the current paths on several of the arrays of the tool 10. Note that the current flow lines turn parallel to the tool 10 axis and return locally, thereby increasing the sensitivity to the vertical resistivity component.

Figure 3:
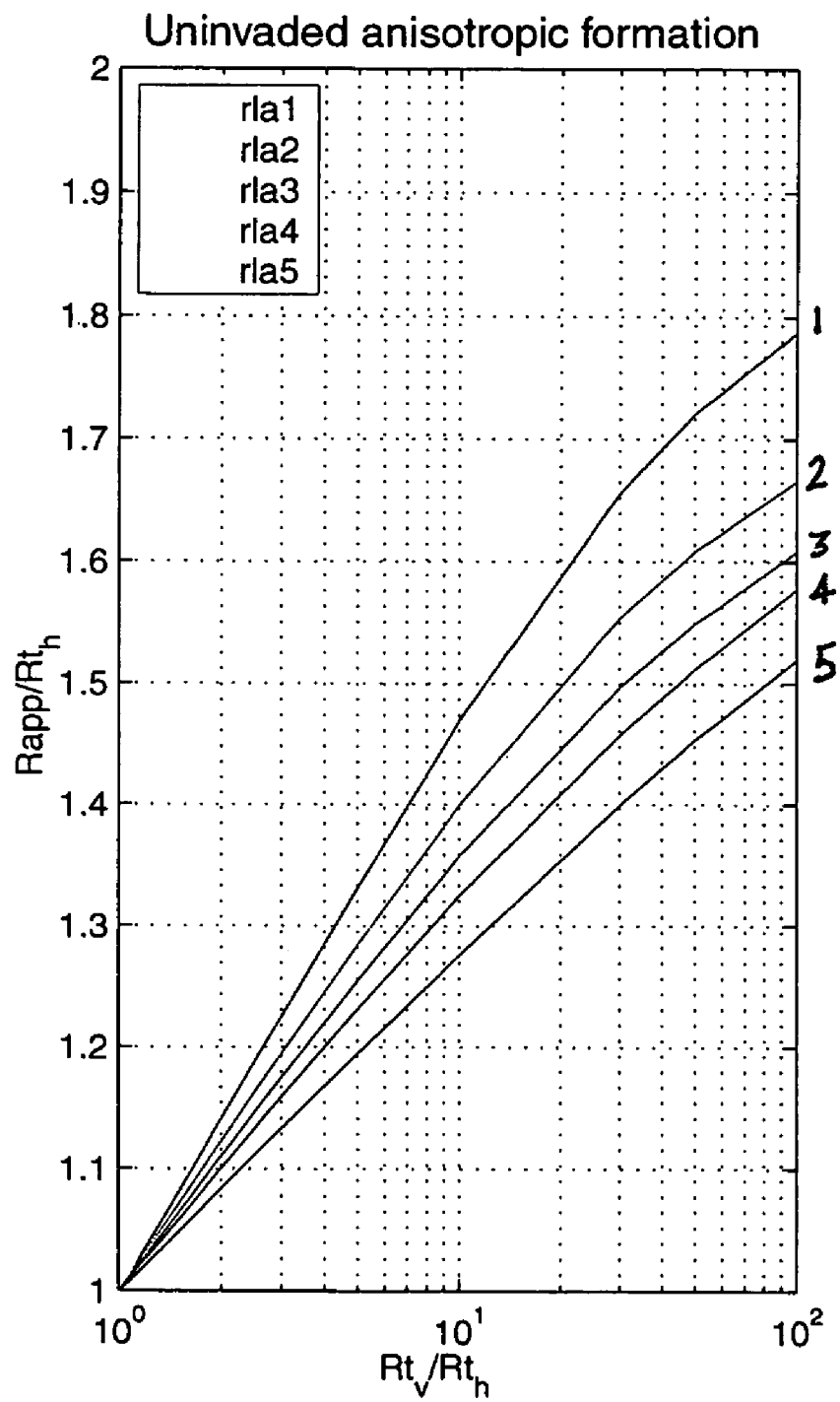
FIG. 3 is a graph showing the response of the five laterolog arrays of FIGS. 1 and 2 in a homogeneous anisotropic formation.

FIG. 3 shows the response of the tool 10 arrays (1–5) to an anisotropic homogeneous formation. The ratio of the apparent resistivity Rapp over the formation horizontal resistivity component $Rt_h$ is plotted against the ratio of the formation vertical resistivity component $Rt_v$ over $Rt_h$. This separation shows that the shallow arrays are much more sensitive to an anisotropic formation than the deeper arrays. Although the homogeneous medium anisotropy response looks favorable, what really matters is the response in the presence of invasion.

Figure 4:
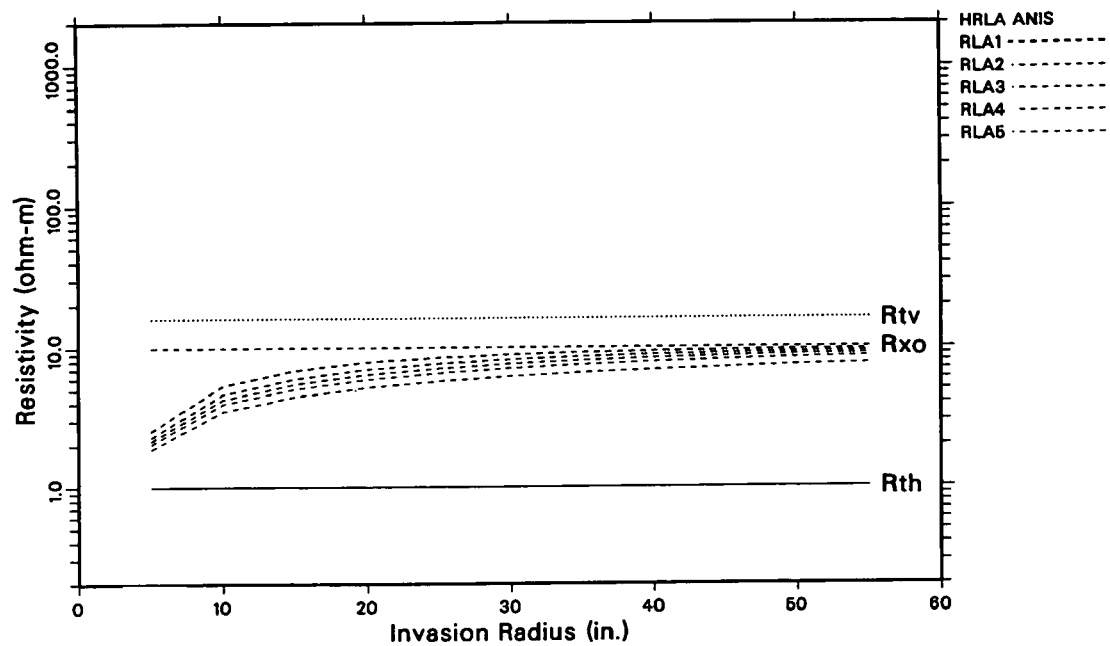
FIGS. 4–7 are graphical illustrations of the responses of the five laterolog arrays of FIGS. 1 and 2 in invaded, anisotropic formations.
Figure 5:
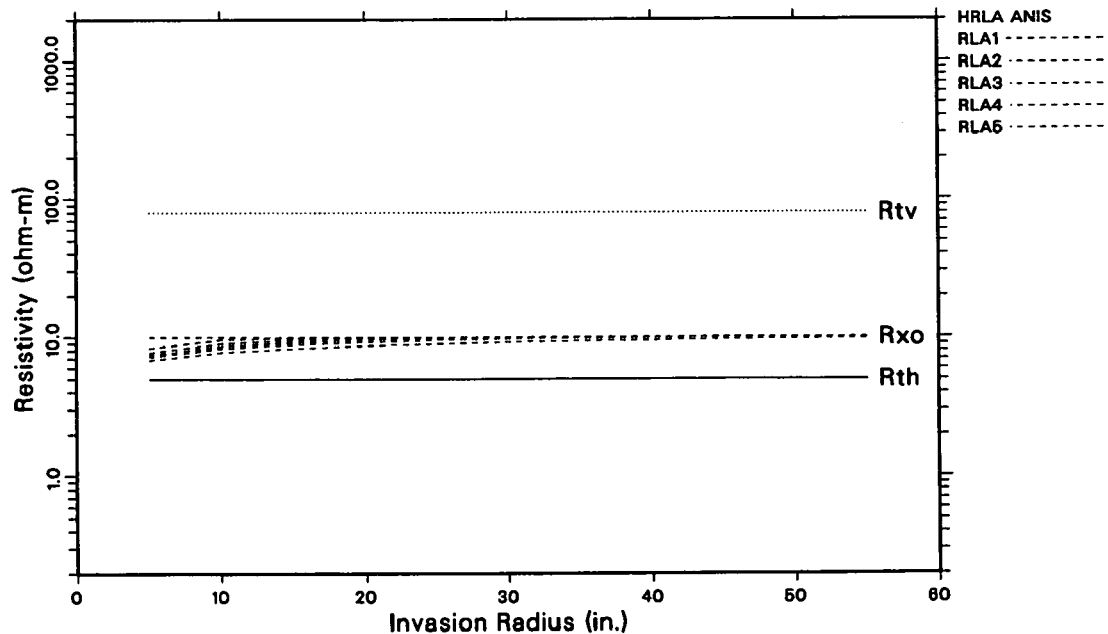
Figure 6:
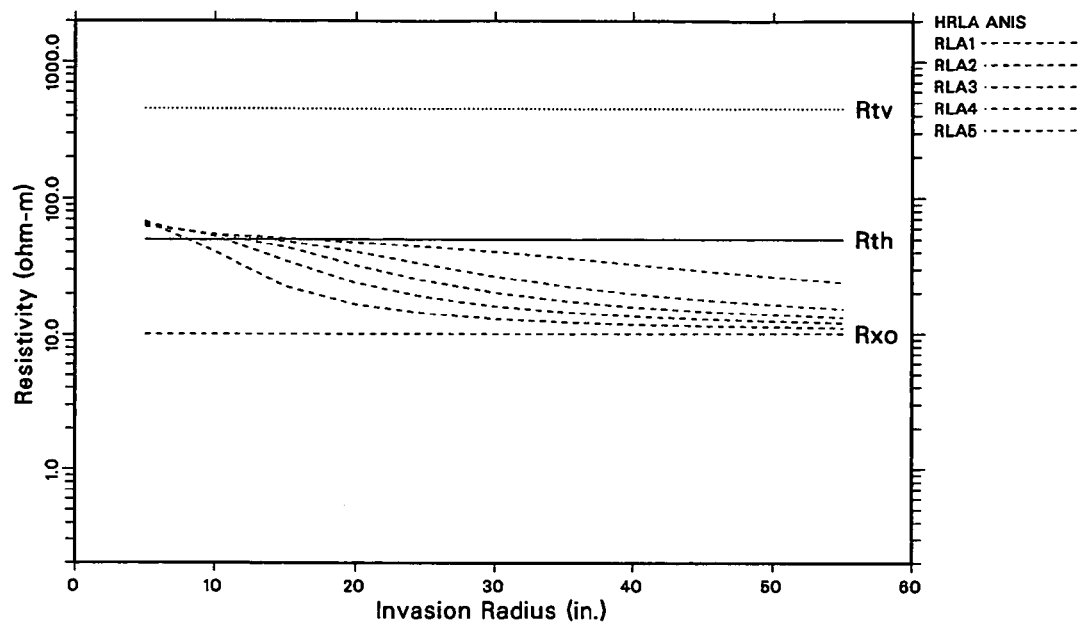
Figure 7:
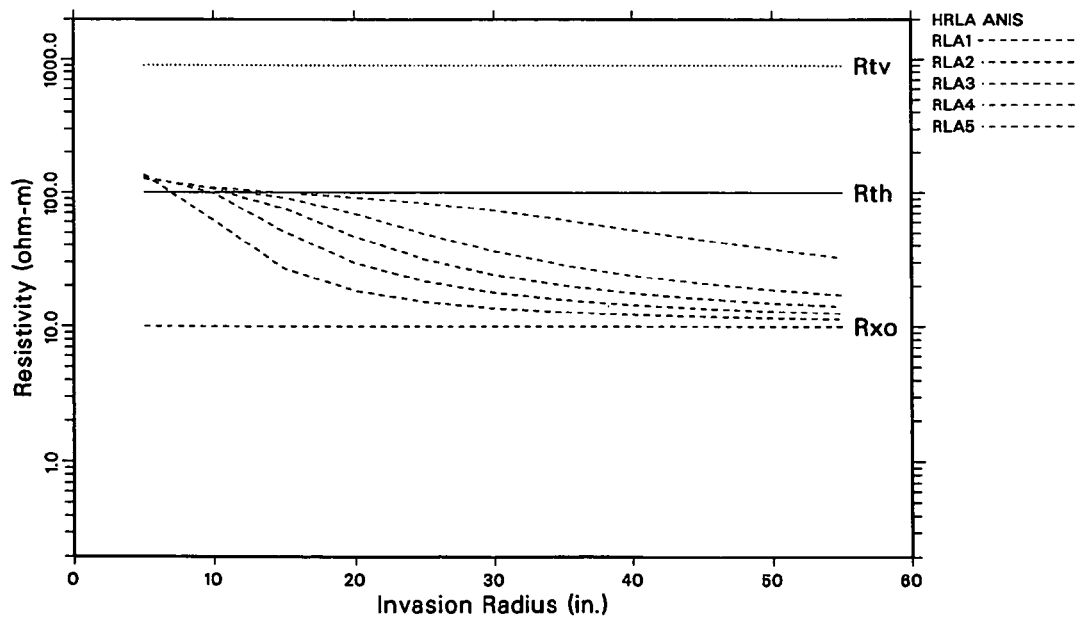

FIGS. 4 through 7 show four representative cases of formation resistivity measurements obtained with a laterolog tool in an anisotropic formation having invasion out to a radius of 60 inches. These figures show ratios of the formation horizontal resistivity component Rth over the formation invasion resistivity Rxo of 0.1, 0.2, 5, and 10. For all the cases Rtv=10×Rth. The invaded zone is isotropic with resistivity Rxo. In FIGS. 4 and 5, Rxo>Rth. In FIGS. 6 and 7, Rxo<Rth. For all these cases, the invasion response confuses the anisotropy response.

Figure 8:
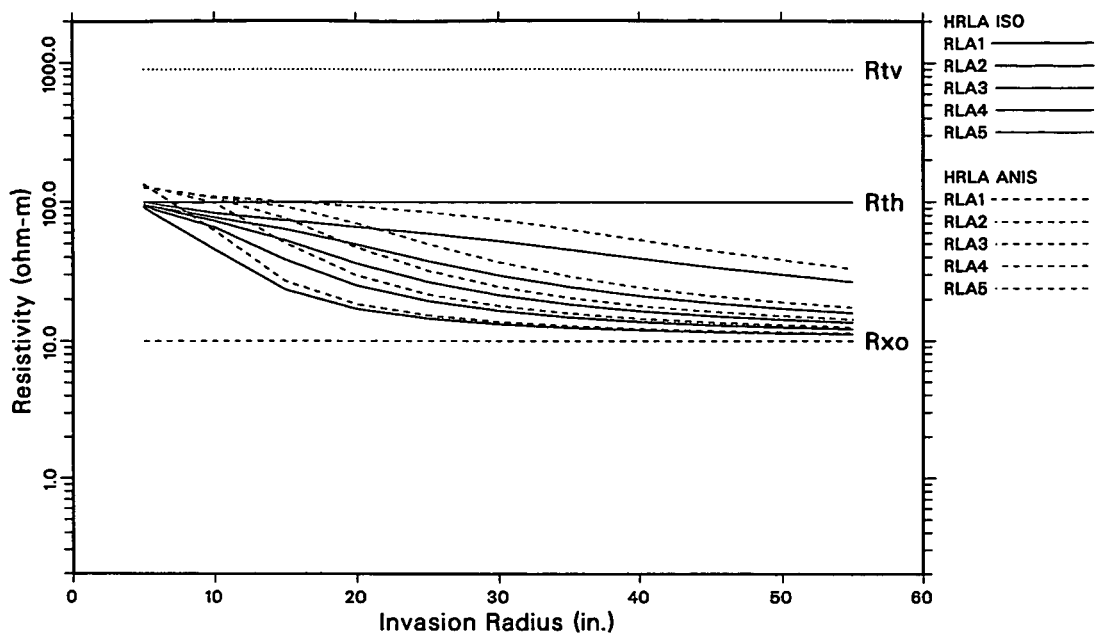
FIG. 8 is a graph showing the comparison of a laterolog tool response in an anisotropic formation vs. its response in an isotropic formation in accord with the invention.

FIG. 8 shows the anisotropic case of FIG. 7 superimposed with the laterolog tool response to an isotropic virgin zone with formation resistivity Rt equal to Rth. As seen in FIG. 8, the two curves representing Array 5 (RLA5) are almost parallel over the range of invasion radius out to 60 inches. The other shallower isotropic-vs.-anisotropic cases show separation at shallow invasion, but little or no separation at deeper invasion radii. The reasonable constancy of the difference between the isotropic and anisotropic Array 5 response suggests that the ratio of anisotropic to isotropic response or other ratios provide useful information.

Designating Raa as the laterolog Array 5 log in an anisotropic formation, and Rai as the laterolog Array 5 log reading in an isotropic formation, the following ratio is derived:

$$\frac{Rai}{(Raa - Rai)}.$$

Figure 9:
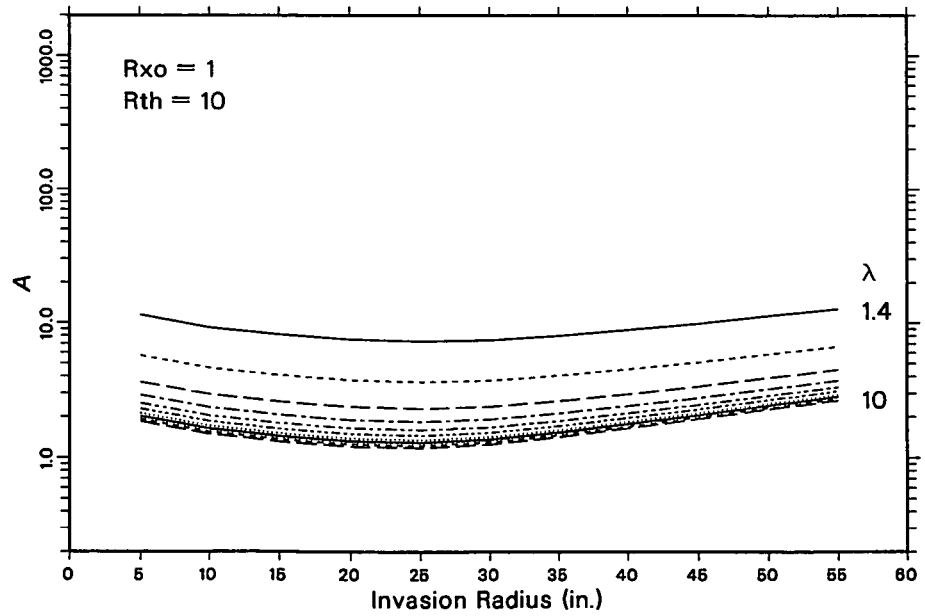
FIG. 9 illustrates several plots of a ratio used in the calculations of the invention.

FIG. 9 shows a plot of the above ratio for Rxo=1 and Rth=10 for λ values from 1.4 to 10, where $$\lambda = \sqrt{\frac{Rtv}{Rth}}.$$

Figure 10:
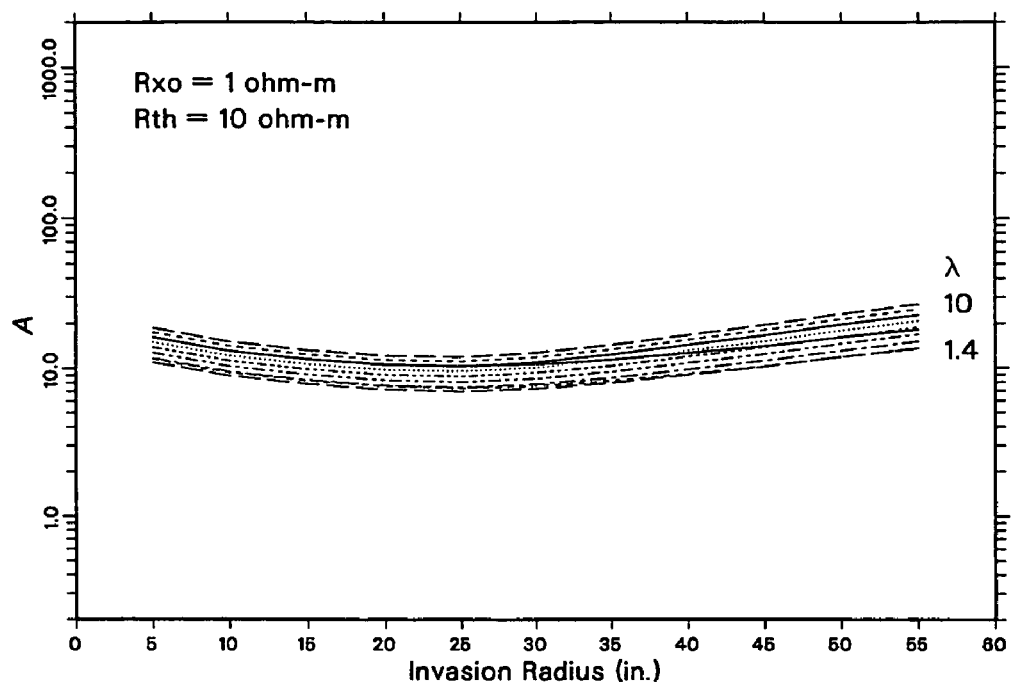
FIG. 10 illustrates the ratio plots of FIG. 9 with an applied scaling factor.

It should be noted that the spread is almost proportional to λ. This suggests that the ratio $$\frac{\lambda Rai}{Raa - Rai}$$

should be nearly constant. This ratio is shown in FIG. 10.

Figure 11:
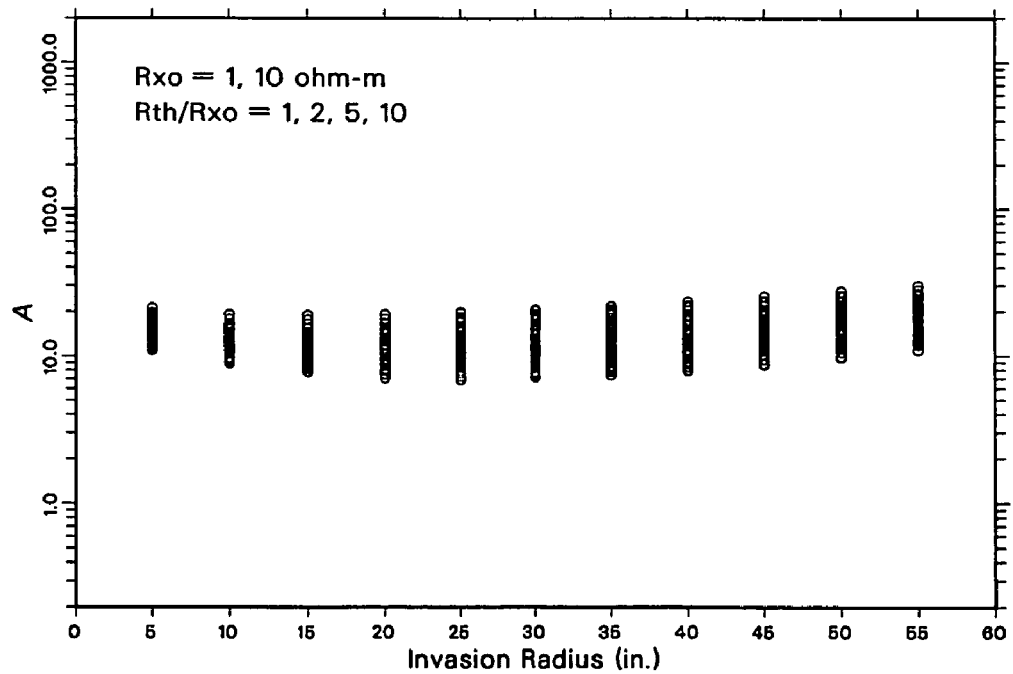
FIG. 11 shows a crossplot for seventy ratios pertaining to cases of formation parameters in accord with the invention.
Figure 12:
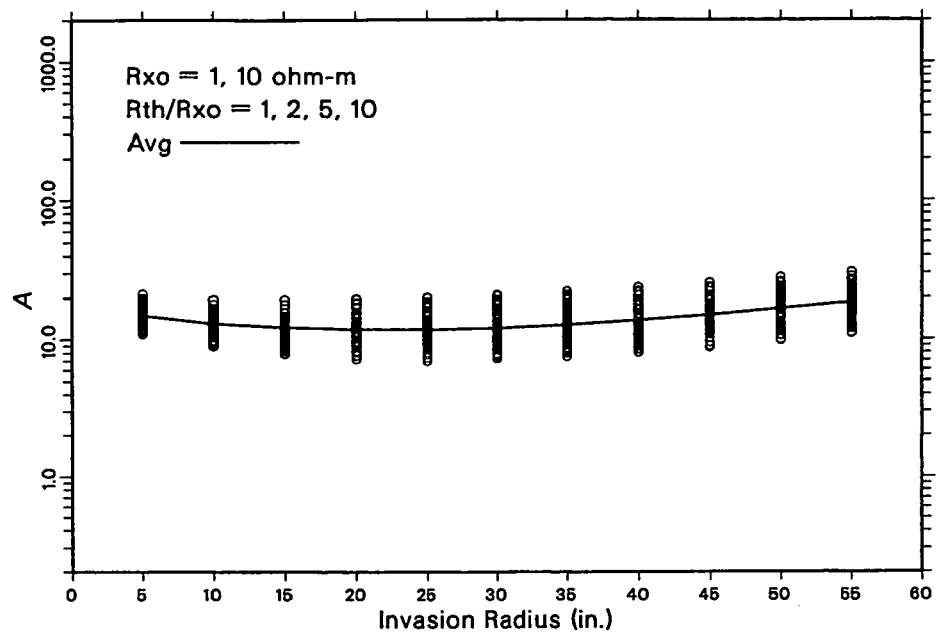
FIG. 12 shows an average value of a parameter for the ratios of FIG. 11 in accord with the invention.

If the ratio $$A = \frac{\lambda Rai}{(Raa - Rai)} \quad (1)$$

is nearly constant for this case, then other values of Rxo and Rth should be looked at. FIG. 11 shows a crossplot of 7 combinations of Rxo and Rth. There are 10 values of λ ranging from 1.4 to 10. The spread in A is remarkably small. FIG. 12 shows the average value of A from the data of FIG. 11. If an average value of A is taken to be a constant (or fitted function of the radius of invasion ri), then the unknown λ can be solved for $$\lambda = A \frac{(Raa - Rai)}{Rai}. \quad (2)$$

One unknown remains in equation (2)—Rai.

As mentioned above, induction tools have little or no sensitivity to Rtv in a vertical well. In such a case, the induction tool log data is inverted for Rxo, Rth, and ri using a lookup table, computer algorithm, model, or any other inversion means as known in the art. Also known in the art is the use of modeling techniques to simulate specific tool responses from given data. By applying a one-dimensional (1D) model of the laterolog tool response to the formation parameters obtained from the induction tool, Rxo, Rth, and ri, the laterolog log data in an isotropic formation (Rai) can be inferred.

Then equation (2) can be solved for λ, and then $$Rtv = \lambda^2 Rth. \quad (3)$$

Figure 13:
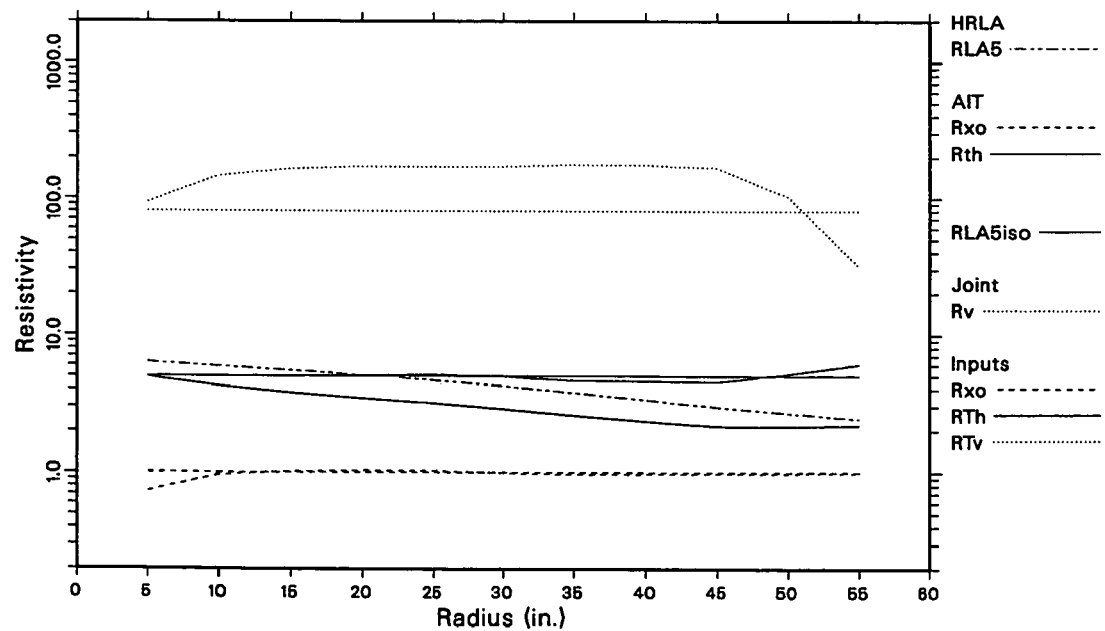
FIG. 13 is a graph showing a computed formation vertical resistivity component in accord with the invention.

FIG. 13 shows such a solution using a fitted value of A as a function of ri. The values for A may be precomputed. The value for A 1D model for the laterolog tool was derived using a simple average J-function, which is only a gross estimate for an example. The estimate of Rtv is within a factor of 2 of the actual value of Rtv in the uninvaded zone. Although a factor of 2 may be considered inaccurate for estimates of petrophysical quantities, such accuracy is ample for determining that anisotropy exists in a vertical well. The accuracy may be improved by refining A. Both induction and laterolog tools have effects in 2D formations (layers and invasion in the layers) that are not accurately modeled with 1D forward models. To test the usefulness of the 1D models used in the recreation of Rai, it is advisable to try the algorithm in a 2D-formation model.

Figure 14:
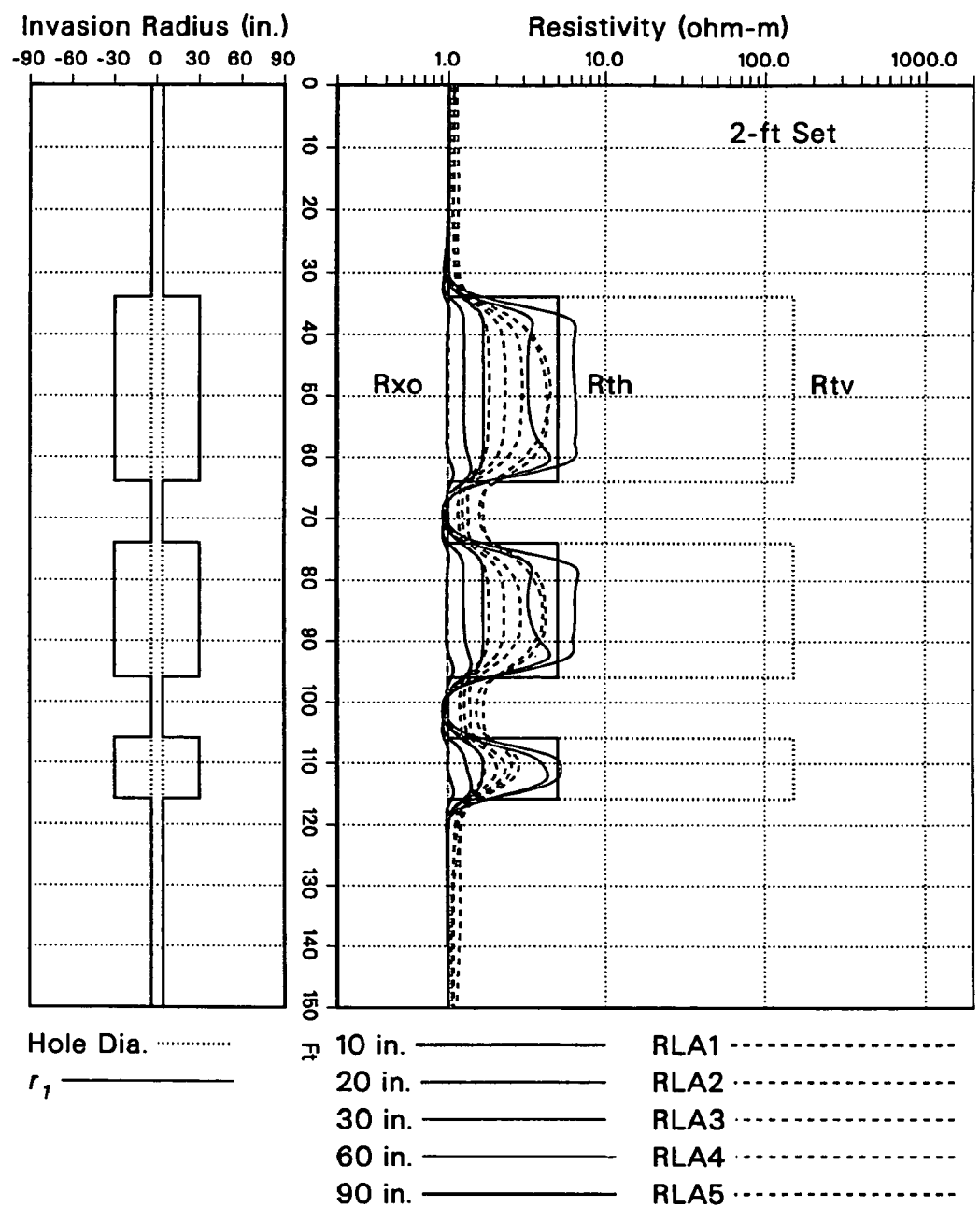
FIG. 14 is a graph showing computed induction tool and laterolog tool logs in accord with the invention.

FIG. 14 shows computed induction and laterolog tool logs in a simple 2D formation with 3 invaded, anisotropic layers of varying thickness. These layers have identical values of Rtv, Rth, Rxo, and ri. The thickness varies from 50 ft. to 10 ft. The induction tool log data reflects the receiver to transmitter spacings (10 in.–90 in.) for the particular tool.

Figure 15:
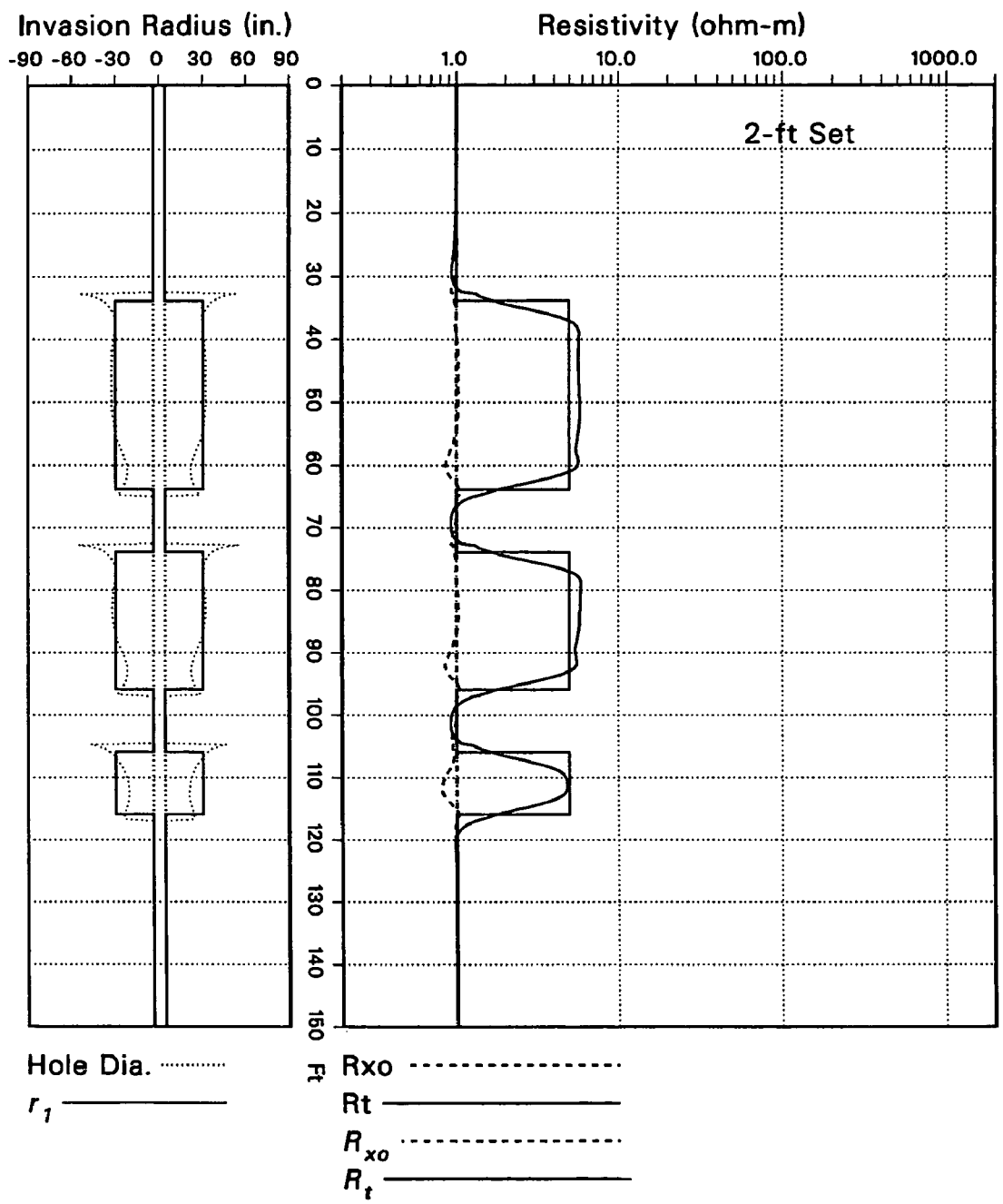
FIG. 15 is a graph showing the inversion of the induction tool data of FIG. 14 using a laterolog model in accord with the invention.
Figure 16:
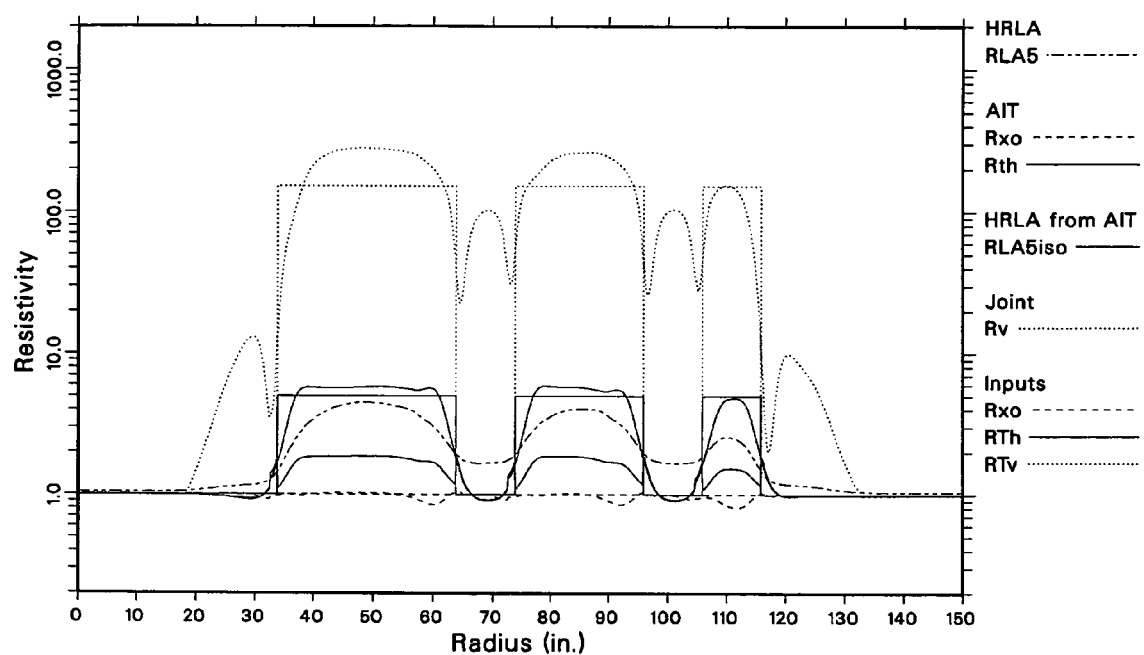
FIG. 16 is a graph showing the vertical resistivity component derived from the data of FIGS. 14 and 15 in accord with the invention.

FIG. 15 shows a modeled laterolog tool log derived from the induction tool log data of FIG. 14. The modeled log data represents the theoretical log values obtainable with the laterolog tool disposed within the isotropic formation. The modeled laterolog log data are then compared against the actual or apparent laterolog log data to compute Rtv as described above. FIG. 16 shows the resulting Rtv log computed from the data of FIGS. 14 and 15.

The Rtv log of FIG. 16 shows anomalies in the non-invaded isotropic beds between the invaded anisotropic beds. As seen in FIG. 14, the laterolog tool logs display shoulder effect in these beds and on either side of the first and third beds. Any source of error that leads to an increased separation between the laterolog tool logs predicted from the induction tool parameters and apparent laterolog tool logs will be interpreted as anisotropy. Overall, however, intelligent interpretation should remove most ambiguity.

Figure 17:
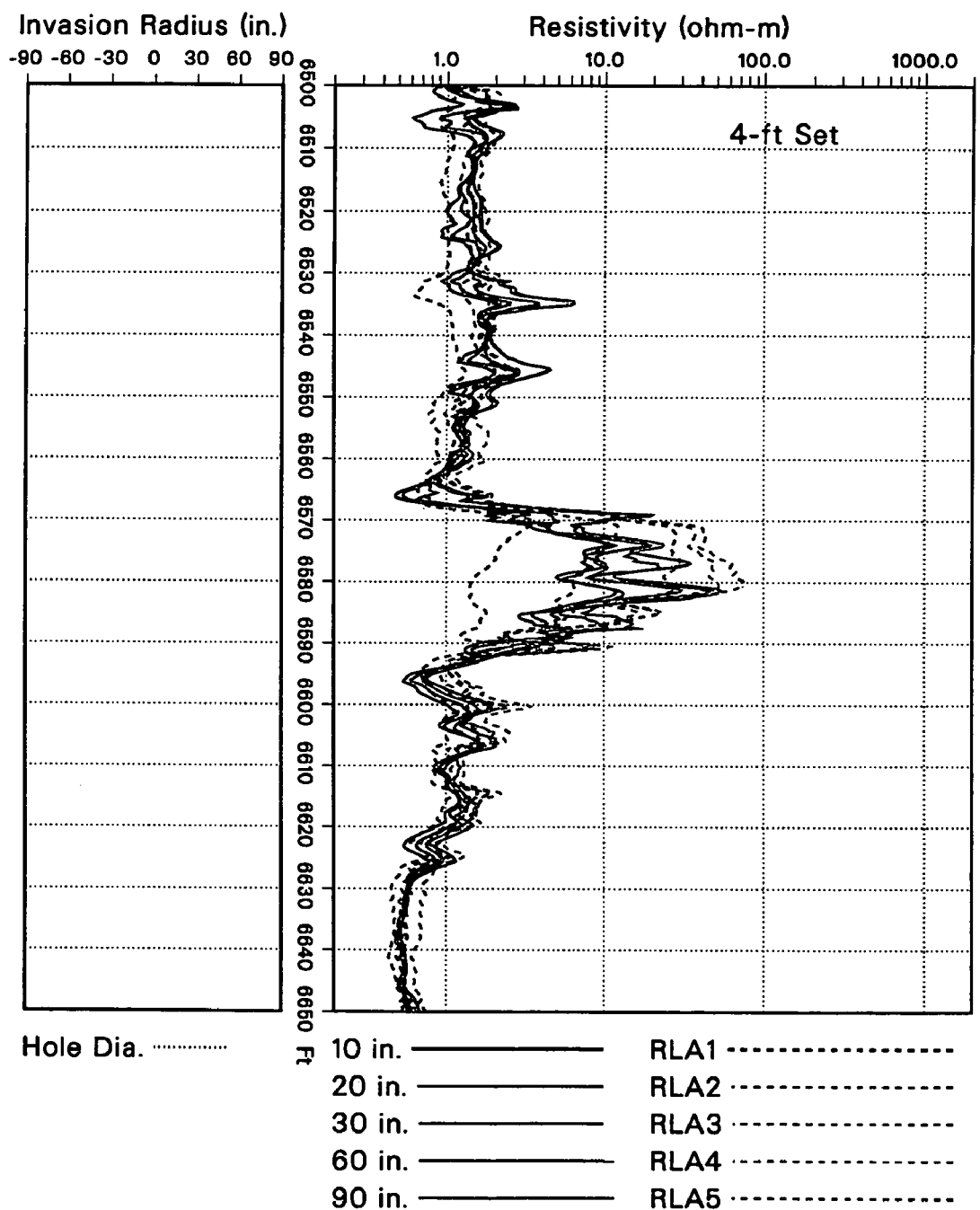
FIG. 17 shows field logs obtained from an induction tool and a laterolog tool in accord with the invention.
Figure 18:
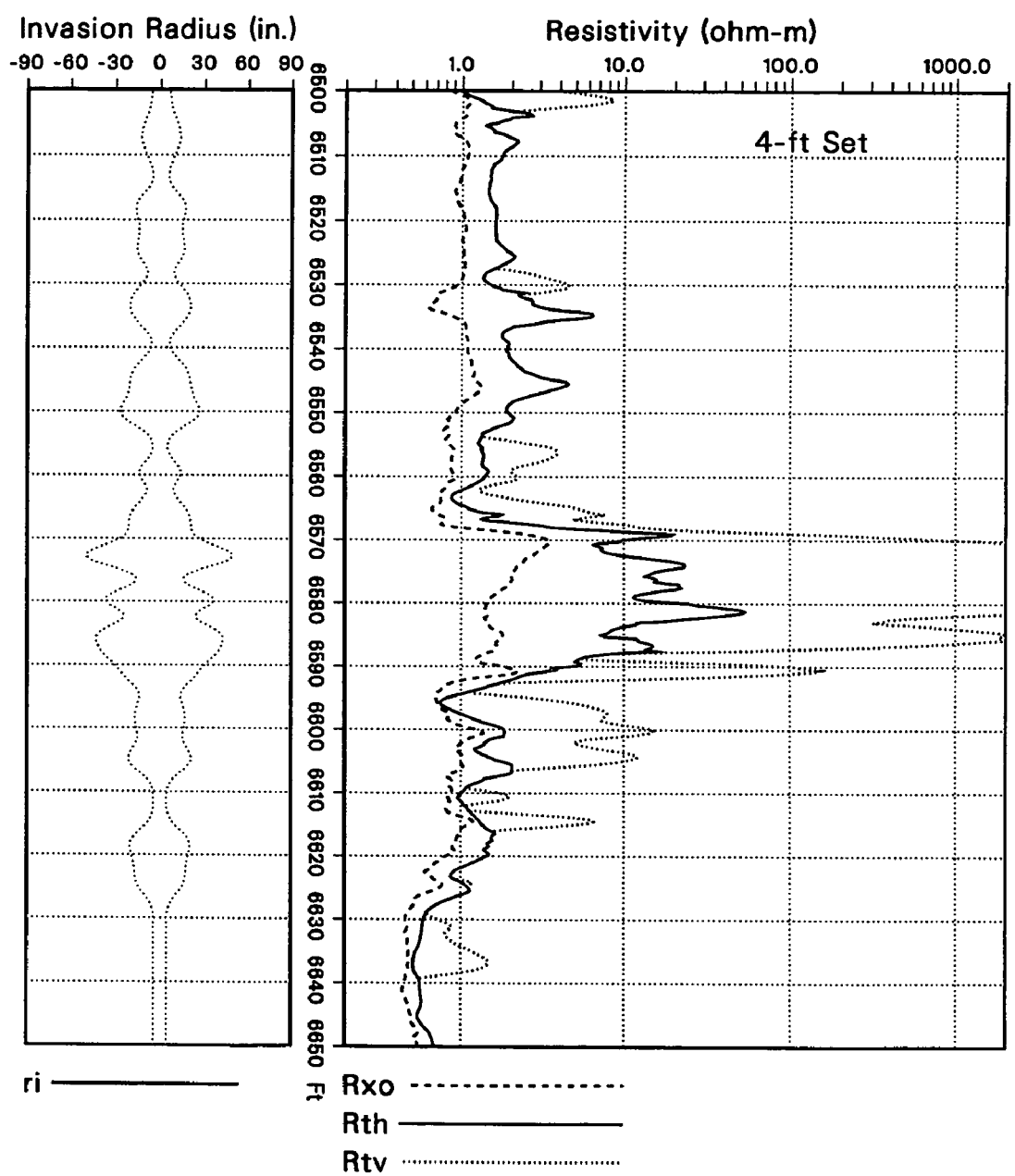
FIG. 18 shows the vertical resistivity component derived from the data of FIG. 17 in accord with the invention.

A field test was conducted comparing a laterolog tool against an induction tool in a formation with expected resistivity anisotropy. FIG. 17 shows the induction tool and laterolog tool logs in a pay sand. FIG. 18 shows the indicated vertical resistivity Rtv along with the induction tool Rth, Rxo, and ri inversion in a zone that exhibits the anisotropy signature. It also exhibits shoulder effect just as in the computed example of FIG. 16.

4.1 Program Storage Device

It will be apparent to those of ordinary skill having the benefit of this disclosure that the present invention may be implemented by programming one or more suitable general-purpose computers having appropriate hardware. The programming may be accomplished through the use of one or more program storage devices readable by the computer processor and encoding one or more programs of instructions executable by the computer for performing the operations described above. The program storage device may take the form of, e.g., one or more floppy disks; a CD ROM or other optical disk; a magnetic tape; a read-only memory chip (ROM); and other forms of the kind well-known in the art or subsequently developed. The program of instructions may be "object code," i.e., in binary form that is executable more-or-less directly by the computer; in "source code" that requires compilation or interpretation before execution; or in some intermediate form such as partially compiled code. The precise forms of the program storage device and of the encoding of instructions are immaterial here.

4.2 Logging System

Figure 19:
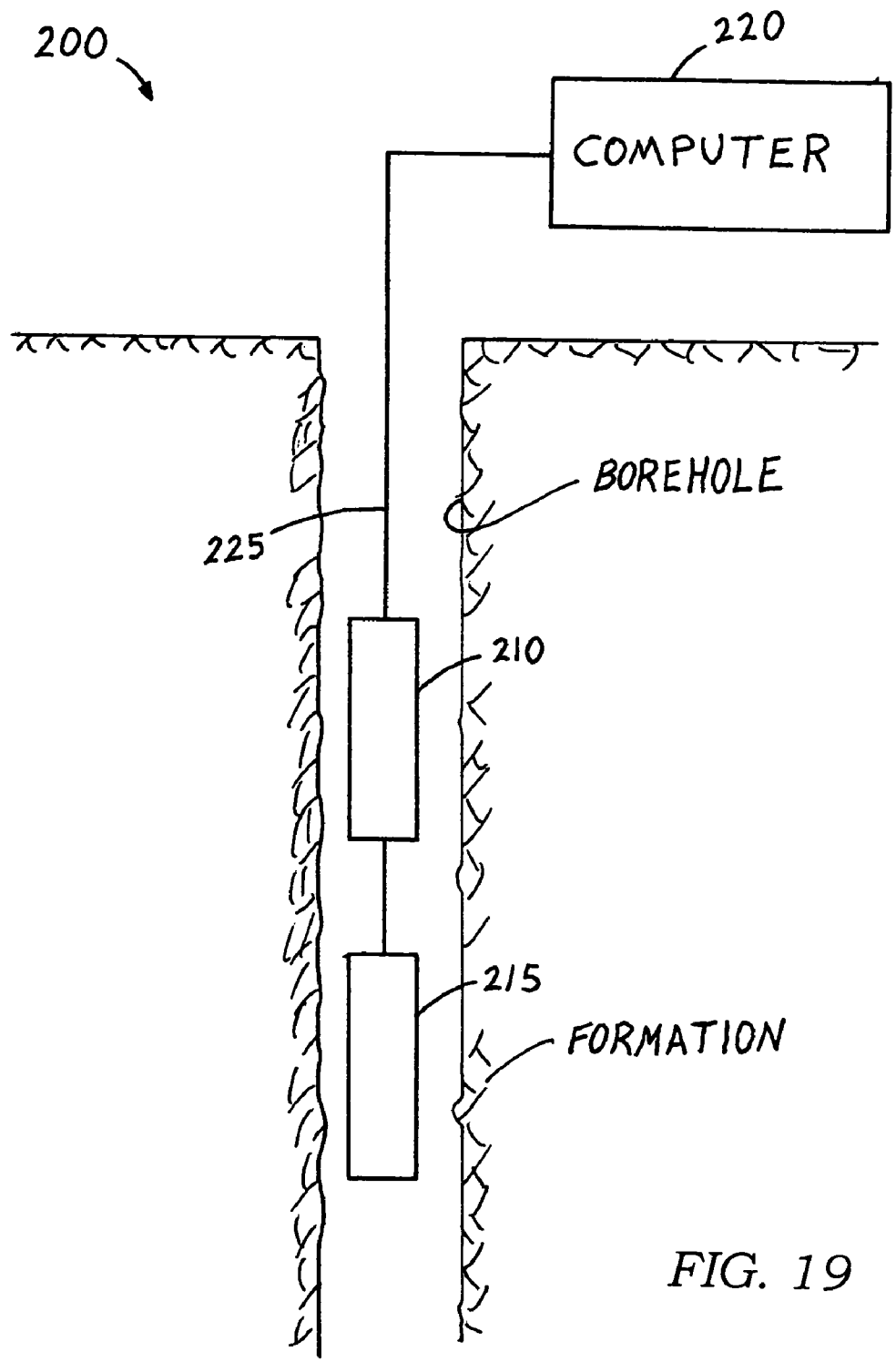
FIG. 19 is a schematic diagram of a well logging system in accord with the invention.

The present invention can be implemented in a logging system 200 with a first well tool 210 and a second well tool 215 adapted to be moveable through a borehole and an apparatus 220 coupled to the tools as shown in FIG. 19. Certain conventional details are omitted in FIG. 19 for clarity of illustration. The apparatus 220 comprises a surface computer (such as the general-purpose computer and program storage device described above) coupled to the well tools 210, 215 by a wireline cable 225 or linked to the tool string's surface instrumentation as known in the art.

The first well tool 210 may be any laterolog-type tool that returns current locally, i.e., to the sonde body. The second well tool 215 may be any propagation or induction tool that provides multiple curves, preferably providing at least three independent measurements to solve for Rxo, Rt, and ri. In addition to the U.S. Patents mentioned above, other useable tools include the instruments described and illustrated in U.S. Pats. Nos. 5,339,037 and 4,968,940, both assigned to the present assignee.

The formation parameters can be determined in real-time by sending the measurement data to the surface as they are acquired, or it can be determined from a recorded-mode by recording the data on a suitable recordable medium. As known in the art, the measured data are transmitted from the tools 210, 215 to the surface computer 220 by electronics (not shown) housed in the tools. The data may be sent to the surface computer 220 along the wireline cable 225 or by mud-pulse telemetry if implemented in a logging-while-drilling configuration. It will be understood that alternative means can be employed for communicating the acquired data to the surface as the precise form of communication is immaterial to the implementation of the disclosed techniques.

Once received by the surface computer 220, the data can be recorded, processed, or computed as desired by the user to generate the formation resistivity profile. The profile can then be recorded on a suitable output record medium. Alternatively, some or all of the processing can be performed downhole and the data can be recorded uphole, downhole, or both. It will be understood that the present invention can be implemented in conjunction with any suitable technique for keeping track of the tool 210, 215 depth within a borehole.

Figure 20:
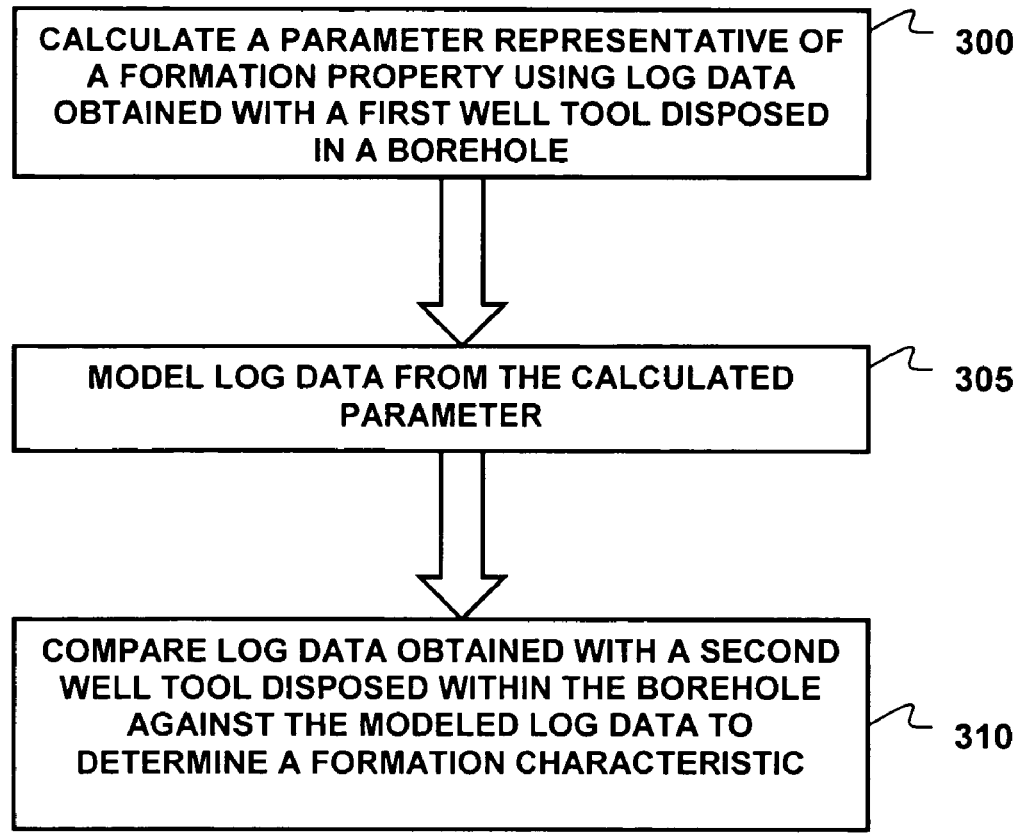
FIG. 20 is a flow diagram of a method in accord with the invention.

FIG. 20 illustrates a flow diagram of a method for determining a characteristic of a subsurface formation surrounding a borehole in accord with the invention. The method comprises calculating at least one parameter representative of a property of the formation using log data obtained with a first well tool disposed within the borehole 300; modeling log data from the at least one calculated parameter 305; and comparing log data obtained with a second well tool disposed within the borehole against the modeled log data to determine the formation characteristic 310.

Figure 21:
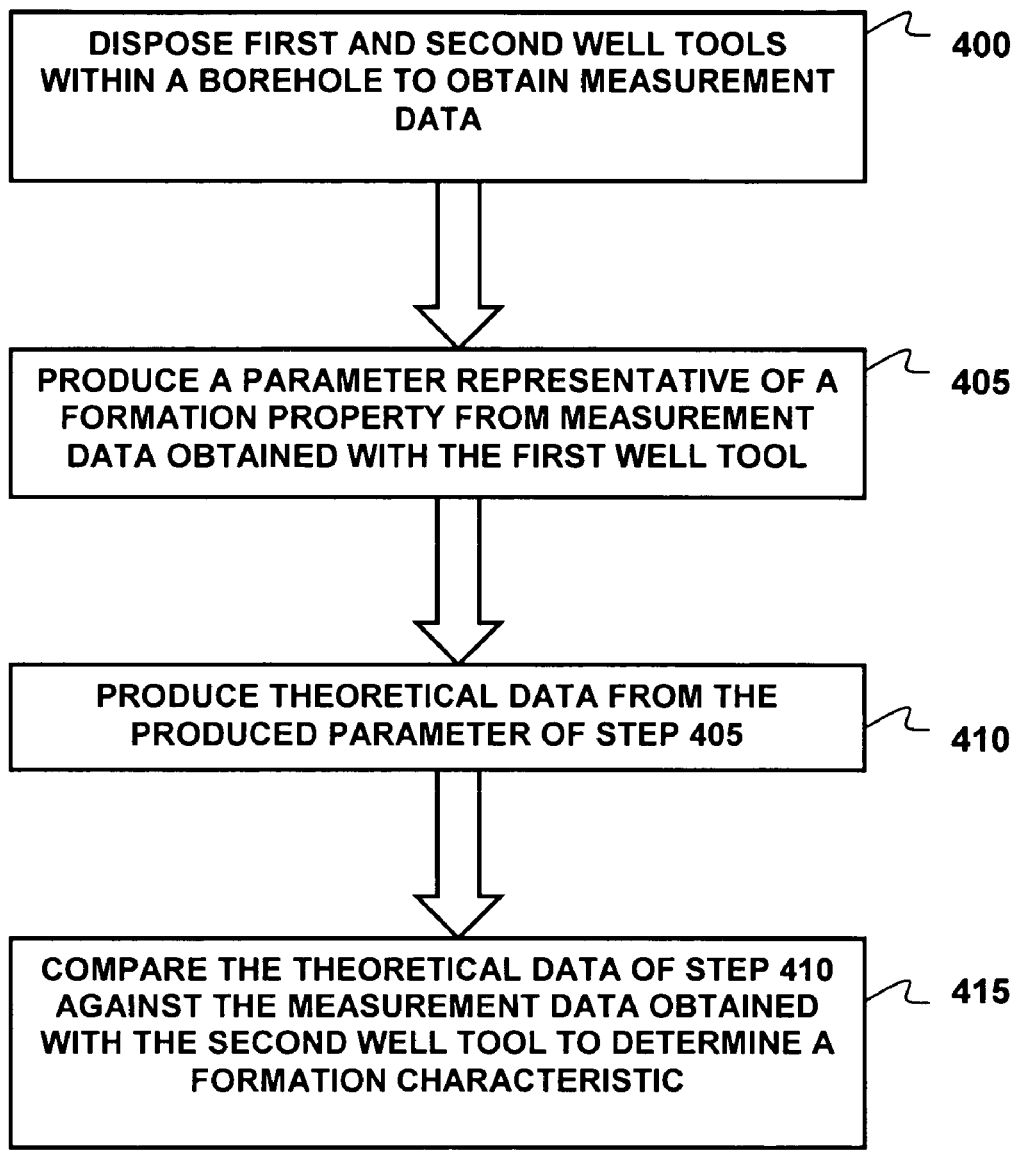
FIG. 21 is a flow diagram of another method in accord with the invention.

FIG. 21 illustrates a flow diagram of a method for determining a characteristic of a subsurface formation surrounding a borehole in accord with the invention. The method comprises disposing first and second well tools within the borehole to obtain measurement data 400; producing at least one parameter representative of a property of the formation from the measurement data obtained with the first well tool 405; producing theoretical data from the at least one produced parameter 410; and comparing the produced theoretical data against the measurement data obtained with the second well tool to determine the formation characteristic 415.

While the methods and apparatus of this invention have been described as specific embodiments, it will be apparent to those skilled in the art that variations may be applied to the structures and in the steps or in the sequence of steps of the methods described herein without departing from the concept and scope of the invention. All such similar variations apparent to those skilled in the art are deemed to be within this concept and scope of the invention as defined by the appended claims.

What is claimed is:

1. A method for determining a characteristic of a subsurface earth formation surrounding a borehole, comprising:
   (a) calculating at least one parameter representative of a property of the formation using empirical log data obtained with a first well tool disposed within the borehole;
   (b) modeling log data representative of log data theoretically obtainable with a second well tool disposed within the borehole;
   (c) correlating the modeled log data with the at least one calculated parameter to simulate log data; and
   (d) comparing empirical log data obtained with the second well tool disposed within the borehole against the simulated log data to determine a resistivity anisotropy profile of the formation.

2. The method of claim 1, wherein step (d) comprises calculating a ratio between the log data obtained with the second well tool and the simulated log data.

3. The method of claim 1, wherein step (d) comprises calculating the difference between the log data obtained with the second well tool and the simulated log data.

4. The method of claim 3, wherein step (d) comprises multiplying the calculated difference by a predetermined factor.

5. The method of claim 1, wherein the first well tool is an induction-type tool.

6. The method of claim 1, wherein the second well tool is a laterolog-type tool.

7. The method of claim 1, wherein the determined anisotropy profile comprises one of a horizontal resistivity component or vertical resistivity component.

8. The method of claim 1, wherein the method is performed during or after drilling of the borehole.

9. A method for determining a characteristic of a subsurface earth formation surrounding a borehole, comprising:
   (a) disposing first and second well tools within the borehole to obtain measurement data;
   (b) producing at least one parameter representative of a property of the formation from the measurement data obtained with the first well tool;
   (c) applying the at least one produced parameter to a response model of the second well tool to produce theoretical data representative of measurement data obtainable with the second well tool disposed within the borehole; and
   (d) comparing the theoretical data of step (c) against the measurement data obtained with the second well tool to determine a resistivity anisotropy profile of the formation.

10. The method of claim 9, wherein step (d) comprises calculating a ratio between the measurement data obtained with the second well tool and the produced theoretical data.

11. The method of claim 9, wherein step (d) comprises calculating the difference between the measurement data obtained with the second well tool and the produced theoretical data.

12. The method of claim 11, wherein step (d) comprises multiplying the calculated difference by a predetermined factor.

13. The method of claim 9, wherein the first well tool is an induction-type tool.

14. The method of claim 9, wherein the second well tool is a laterolog-type tool.

15. The method of claim 9 wherein the determined anisotropy profile comprises one of a horizontal resistivity component or vertical resistivity.

16. The method of claim 9, wherein the method is performed during or after drilling of the borehole.

17. A well logging system including first and second well tools adapted to be moveable through a borehole and an apparatus adapted to be coupled to the well tools, the apparatus being adapted to respond to data obtained with the well tools to determine a characteristic of a formation, the apparatus comprising:
   means for calculating at least one parameter representative of a property of the formation using empirical log data obtained with the first well tool disposed within the borehole;
   means for modeling log data that is representative of log data theoretically obtainable with the second well tool disposed within the borehole;
   means for correlating the modeled log data with the at least one calculated parameter to simulate log data; and
   means for comparing empirical log data obtained with the second well tool disposed within the borehole against the simulated log data to determine a resistivity anisotropy profile of the formation.

18. The system of claim 17, the comparison means further comprising means for calculating a ratio between the log data obtained with the second well tool and the simulated log data.

19. The system of claim 17, the comparison means further comprising means for calculating the difference between the log data obtained with the second well tool and the simulated log data.

20. The system of claim 17, wherein the first well tool is an induction-type tool.

21. The system of claim 17, wherein the second well tool is a laterolog-type tool.

22. The system of claim 17, wherein the determined anisotropy profile comprises one of a horizontal resistivity component or vertical resistivity component.

23. A program storage device readable by a processor and encoding a program of instructions including instructions for performing the apparatus operations recited in claim 17.

* * * * *